3,304,167
NORBORNYL AND SUBSTITUTED NORBORNYL UREAS AND THIOUREAS, WEED CONTROL COMPOSITIONS AND METHODS
George A. Buntin, Wilmington, and William R. Diveley, Newark, Del., assignors to Hercules Incorporated, a corporation of Delaware
No Drawing. Filed Dec. 15, 1960, Ser. No. 75,917
16 Claims. (Cl. 71—2.6)

This application constitutes a continuation-in-part of our application for United States Letters Patent, Serial No. 5,670, filed February 1, 1960, now abandoned.

This invention relates to new compositions of matter and more particularly to compositions for controlling growth of undesired plants and to methods of utilizing such compositions.

Herbicidally active compounds of the present invention are represented by the structural formula

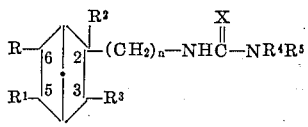

in which R and $R^1$ substituents on the norbornyl ring represent radicals selected from the following combinations:

R AND $R^1$

| | |
|---|---|
| —H | —H |
| —Cl | —H |
| —$CH_3$ | —H |
| —$CH_3$ | —$CH_3$ |
| —CH—CH=CH— | |
| —$CH_2CH_2CH_2$— | |
| —$C_2H_5$ | —H |
| —Cl | —Cl |
| —$C_3H_{7-n}$ | —H |
| —CHCl—CHCl—$CH_2$— | |
| —Cl | —$CH_3$ |
| —CH=CH—CH—$CH_3$ | |
| —$OCH_3$ | —H |
| —$OC_2H_5$ | —H |
| —$CH_2Cl$ | —H |
| —H | —CN |

$n$ is zero or one, X is oxygen or sulfur, $R^2$, $R^3$ and $R^4$ are hydrogen or alkyl radicals, $R^5$ is $OR^6$ or $R^6$, and $R^6$ is an alkyl radical, said alkyl radicals having 1 to 4 carbon atoms such that the total carbons in $R^2$ and $R^3$ does not exceed 4 and the total number of carbons in $R^4$ and $R^5$ is in the range of 1 to 8.

The compounds of this invention are all characterized by having a substituted or unsubstituted norbornyl ring attached directly or by a methylene group to a substituted urea or thiourea grouping. The nature of the substituent influences the herbicidal activity to some extent in each instance, particularly with respect to reducing the toxicity to certain plants, so that by proper selection it is possible to influence the selective herbicidal activity of the compounds as a whole. The most interesting compounds of the group are those in which $R^4$ is methyl and $R^5$ is a methoxyl or methyl radical, $n=0$ and the R, $R^1$, $R^2$, $R^3$ substituents represent the following combinations:

(—H, —H, —H, —H)
(—CL, —H, —H, —H)
(—$CH_3$, —H, —H, —H)
(—$CH_3$, —$CH_3$, —H, —H)
(—$CH_2$—CH=CH—, —H, —H)
(—Cl, —Cl, —H, —H)
(—Cl, —$CH_3$, —H, —H)
(—$C_2H_5$, —H, —H, —H)
(—H, —H, —$CH_3$, —H)
and
(—H, —H, —H, —$CH_3$).

The compounds in which $n$ is 1 are adjacent homologs of those in which $n$ is zero and have similar herbicidal activity.

The compounds of this invention are advantageously used in combination with strong organic acids which markedly increase the solubility of the compounds in organic solvents, especially in the absence of water. Examples of strong acids contemplated are the chlorinated and fluorinated aliphatic acids and whose ionization constant as measured in water is at least $1 \times 10^{-3}$.

The compounds of the present invention having a norbornyl ring in the molecule are prepared by combinations of the following general reactions.

*Preparation of starting materials*

(1) 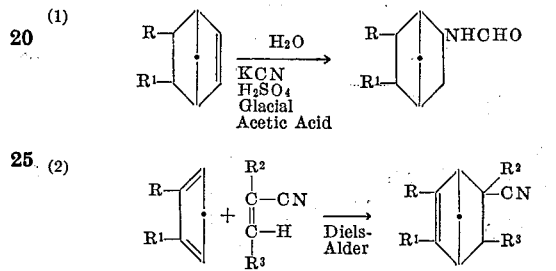

(2)

(3)

where R and $R^1$=—H, and $R^2$ and $R^3$=—H or —$CH_3$

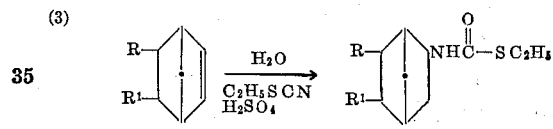

*Preparation of amine intermediates*

(4) 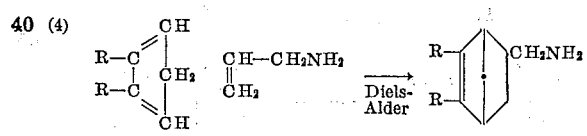

where R=H (5) 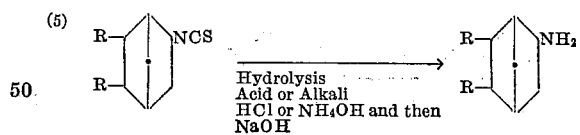

(6) 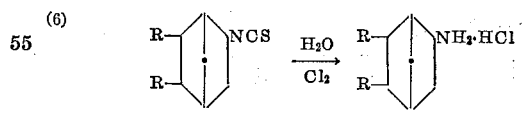

(7) 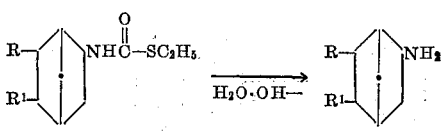

(8) 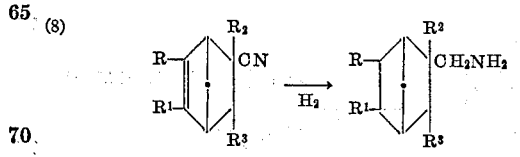

where R and $R^1$=H, and $R^2$ and $R^3$=—H or —$CH_3$

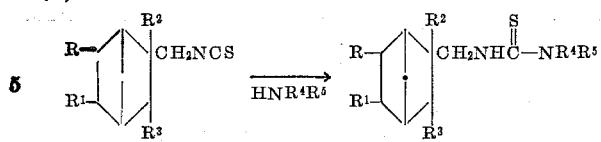

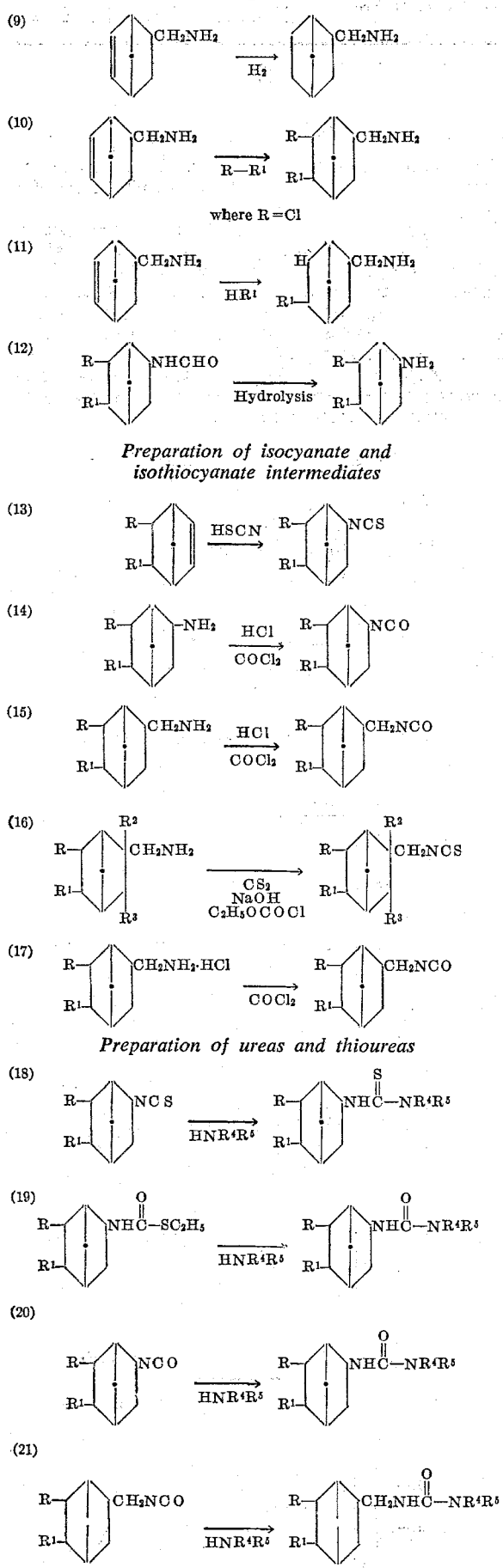

Preparation of isocyanate and isothiocyanate intermediates

Preparation of ureas and thioureas

The following compounds are illustrative of the herbicidally active compounds of this invention:

1-methyl-3-(2-norbornyl)urea
1,1-dimethyl-3-(2-norbornyl)urea
1,1-dimethyl-3-(2-norbornyl)-2-thiourea
1-ethyl-3-(2-norbornyl)urea
1,1-diethyl-3-(2-norbornyl)urea
1,1-diethyl-3-(2-norbornyl)-2-thiourea
1-n-propyl-3-(2-norbornyl)urea
1-n-propyl-3-(2-norbornyl)-2-thiourea
1,1-di-n-propyl-3-(2-norbornyl)urea
1,1-di-n-propyl-3-(2-norbornyl)-2-thiourea
1-i-propyl-3-(2-norbornyl)urea
1-i-propyl-3-(2-norbornyl)-2-thiourea
1,1-di-i-propyl-3-(2-norbornyl)urea
1,1-di-i-propyl-3-(2-norbornyl)-2-thiourea
1-methyl-1-ethyl-3-(2-norbornyl)-2-thiourea
1-methyl-1-n-propyl-3-(2-norornyl)-2-thiourea
1-methyl-1-n-propyl-3-(2-norbornyl)-2-thiourea
1-methyl-1-n-butyl-3-(2-norbornyl)-2-thiourea
1-methyl-1-i-butyl-3-(2-norbornyl)-2-thiourea
1-methyl-1-t-butyl-3-(2-norbornyl)-2-thiourea
1-ethyl-1-n-propyl-3-(2-norbornyl)-2-thiourea
1-ethyl-1-i-propyl-3-(2-norbornyl)-2-thiourea
1-ethyl-1-n-butyl-3-(2-norbornyl)-2-thiourea
1-ethyl-1-i-butyl-3-(2-norbornyl)-2-thiourea
1-ethyl-1-t-butyl-3-(2-norbornyl)-2-thiourea
1-i-propyl-1-n-butyl-3-(2-norbornyl)-2-thiourea
1-i-propyl-1-i-butyl-3-(2-norbornyl)-2-thiourea
1-i-propyl-1-t-butyl-3-(2-norbornyl)-2-thiourea
1-allyl-3-(2-norbornyl)urea
1,1-diallyl-3-(2-norbornyl)urea
1-methyl-3-chloronorbornyl-2-thiourea
1,1-dimethyl-3-(5 or 6-chloronorbornyl)urea
1,1-dimethyl-3-(5 or 6-chloronorbornyl)-2-thiourea
1-ethyl-3-(5 or 6-chloronorbornyl)urea
1-ethyl-3-(5 or 6-chloronorbornyl)-2-thiourea
1,1-diethyl-3-(5 or 6-chloronorbornyl)urea
1,1-diethyl-3-(5 or 6-chloronorbornyl)-2-thiourea
1-n-propyl-3-(5 or 6-chloronorbornyl)urea
1-n-propyl-3-(5 or 6-chloronorbornyl)-2-thiourea
1,1-di-n-propyl-3-(5 or 6-chloronorbornyl)urea
1,1-di-n-propyl-3-(5 or 6-chloronorbornyl)-2-thiourea
1-i-propyl-3-(5 or 6-chloronorbornyl)urea
1-i-propyl-3-(5 or 6-chloronorbornyl)-2-thiourea
1,1-di-i-propyl-3-(5 or 6-chloronorbornyl)urea
1,1-di-i-propyl-3-(5 or 6-chloronorbornyl)-2-thiourea
1-methyl-1-n-butyl-3-(5 or 6-chloronorbornyl)urea
1-allyl-3-(5 or 6-chloronorbornyl)urea
1,1-diallyl-3-(5 or 6-chloronorbornyl)urea
1,1-dimethyl-3-(5,6-dichloronorbornyl)urea
1,1-dimethyl-3-(5,6-dichloronorbornyl)-2-thiourea
1,1-dimethyl-3-(trichloronorbornyl)urea
1,1-dimethyl-3-(5 or 6-methylnorbornyl)urea
1,1-dimethyl-3-(5 or 6-methylnorbornyl)-2-thiourea
1,1-dimethyl-3-(5 or 6-chloromethylnorbornyl)urea
1,1-dimethyl-3-(5 or 6-chloromethylnorbornyl)-2-thiourea
1,1-dimethyl-3-(5 or 6-cyanonorbornyl)-2-thiourea
1,1-diethyl-3-(5 or 6-methylnorbornyl)-2-thiourea
1,1-dimethyl-3-(5 or 6-methoxynorbornyl)-2-thiourea
1,1-dimethyl-3-(5 or 6-ethoxynorbornyl)-2-thiourea
1,1-dimethyl-3-(5,6-dimethylnorbornyl)-2-thiourea
1,1-diethyl-3-(5 or 6-chloromethylnorbornyl)-2-thiourea
1,1-dimethyl-3-(2-norbornylmethyl)-2-thiourea
1,1-dimethyl-3-(2-norbornylmethyl)urea 1,1-diethyl-3-(2-norbornylmethyl)urea
1-methyl-3-(2-norbornylmethyl)urea
1-methyl-1-n-butyl-3-(2-norbornylmethyl)urea
1-ethyl-3-(2-norbornylmethyl)urea
1,1-diethyl-3-[5-(2,3,3a,4,5,6,7,7a-octahydro-4,7-methanoindenyl)]-2-thiourea
1-methyl-3-[5-(2,3,3a,4,5,6,7,7a-octahydro-4,7-methanoindenyl)]-2-thiourea
1-methyl-1-n-butyl-3-[5-(2,3,3a,4,5,6,7,7a-octahydro-4,7-methanoindenyl)]urea
1,1-diethyl-3-[5-(2,3,3a,4,5,6,7,7a-octahydro-4,7-methanoindenyl)]urea
1-methyl-3-[5-(2,3,3a,4,5,6,7,7a-octahydro-4,7-methanoindenyl)]urea
1,1-diethyl-3-[5-(2,3,3a,4,5,6,7,7a-octahydro-4,7-methanoindenyl)]urea
1,1-dimethyl-3-(5-methyl-6-ethyl-2-norbornyl)-2-thiourea
1,1-dimethyl-3-(6-methyl-5-ethyl-2-norbornyl)-2-thiourea
1,1-dimethyl-3-(5-n-butoxy-2-norbornyl)-2-thiourea
1,1-dimethyl-3-(6-n-butoxy-2-norbornyl)-2-thiourea
1,1-dimethyl-3-(5-n-butyl-2-norbornyl)-2-thiourea
1,1-dimethyl-3-(6-n-butyl-2-norbornyl)-2-thiourea
1,1-diethyl-3-(5-methyl-2-norbornyl)urea
1,1-diethyl-3-(6-methyl-2-norbornyl)urea
1-methyl-3-(5-methyl-2-norbornyl)urea
1-methyl-3-(6-methyl-2-norbornyl)urea
1,1-dimethyl-3-(5-methyl-2-norbornyl)urea
1,1-dimethyl-3-(6-methyl-2-norbornyl)urea
1,1-dimethyl-3-(5,6-dimethyl-2-norbornyl)urea
1,1-dimethyl-3-(5,6-dimethyl-2-norbornyl)-2-thiourea
1,1-diethyl-3-(5,6-dimethyl-2-norbornyl)urea
1,1-dimethyl-3-(5-chloro-6-methyl-2-norbornyl)-2-thiourea
1,1-dimethyl-3-(5-chloro-6-methyl-2-norbornyl)urea
1,1-dimethyl-3-(5 or 6-ethyl-2-norbornyl)urea
1,1-dimethyl-3-(5,6-dichloro-2-norbornyl)urea
1,1-diethyl-3-(5-ethyl-2-norbornyl)urea
1-methyl-1-n-butyl-3-(5-ethyl-2-norbornyl)urea
1-methyl-3-(5-ethyl-2-norbornyl)urea
1,1-dimethyl-3-(5-phenyl-2-norbornyl)urea
1,1-dimethyl-3-[5-(2,3,3a,4,5,6,7,7a-octahydro-4,7-methanoindenyl)]urea
1,1-dimethyl-3-[5-(2,3,3a,4,5,6,7,7a-octahydro-4,7-methanoindenyl)]-2-thiourea
1,1-dimethyl-3-[5-(3a,4,5,6,7,7a-hexahydro-4,7-methanoindenyl)]urea
1,1-dimethyl-3-[5-(3a,4,5,6,7,7a-hexahydro-4,7-methanoindenyl)]-2-thiourea
1-methyl-3-[5-(3a,4,5,6,7,7a-hexahydro-4,7-methanoindenyl)]urea
1-ethyl-3-[5-(3a,4,5,6,7,7a-hexahydro-4,7-methanoindenyl)]urea
1,1-diethyl-3-[5-(3a,4,5,6,7,7a-hexahydro-4,7-methanoindenyl)]urea
1,1-diethyl-3-[5-(3a,4,5,6,7,7a-hexahydro-4,7-methanoindenyl)]-2-thiourea
1-n-propyl-3-[5-(3a,4,5,6,7,7a-hexahydro-4,7-methanoindenyl)]urea
1-n-propyl-3-[5-(3a,4,5,6,7,7a-hexahydro-4,7-methanoindenyl)]-2-thiourea
1,1-di-n-propyl-3-[5-(3a,4,5,6,7,7a-hexahydro-4,7-methanoindenyl)]urea
1,1-di-n-propyl-3-[5-(3a,4,5,6,7,7a-hexahydro-4,7-methanoindenyl)]-2-thiourea
1,1-diisopropyl-3-[5-(3a,4,5,6,7,7a-hexahydro-4,7-methanoindenyl)]urea
1,1-diisopropyl-3-[5-(3a,4,5,6,7,7a-hexahydro-4,7-methanoindenyl)]-2-thiourea
1-isopropyl-3-[5-(3a,4,5,6,7,7a-hexahydro-4,7-methanoindenyl)]urea
1-isopropyl-3-[5-(3a,4,5,6,7,7a-hexahydro-4,7-methanoindenyl)]-2-thiourea
1-methyl-1-n-butyl-3-[5-(3a,4,5,6,7,7a-hexahydro-4,7-methanoindenyl)]urea
1-allyl-3-[5-(3a,4,5,6,7,7a-hexahydro-4,7-methanoindenyl)]urea
1,1-diallyl-3-[5-(3a,4,5,6,7,7a-hexahydro-4,7-methanoindenyl)]urea
1-n-butyl-3-[5-(3a,4,5,6,7,7a-hexahydro-4,7-methanoindenyl)]urea
1,1-dimethyl-3-[5-(2,3,3a,4,5,6,7,7a-octahydro-2,3-dichloro-4,7-methanoindenyl)]urea
1-methyl-1-butyl-3-[5-(2,3,3a,4,5,6,7,7a-octahydro-2,3-dichloro-4,7-methanoindenyl)]urea
1,1-diethyl-3-[5-(2,3,3a,4,5,6,7,7a-octahydro-2,3-dichloro-4,7-methanoindenyl)]urea
1-methyl-3-[5-(2,3,3a,4,5,6,7,7a-octahydro-2,3-dichloro-4,7-methanoindenyl)]urea
1,1-dimethyl-3-(2-(2-methylbicyclo[2.2.1]heptylmethyl))urea
1,1-dimethyl-3-(2-(3-methylbicyclo[2.2.1]heptylmethyl))urea
1-methyl-1-methoxy-3-(5 or 6-chloronorbornyl)urea
1-methyl-1-methoxy-3-[5-(3a,4,5,6,7,7a-hexahydro-4,7-methanoindenyl)]urea
1-methyl-1-methoxy-3-[5-(3a,4,5,6,7,7a-hexahydro-4,7-methanoindenyl)]-2-thiourea All of these compounds are rendered more soluble in benzene, toluene, hexane, kerosene and other hydrocarbon solvents than otherwise by admixture with an equimolecular amount of trichloracetic acid, dichloracetic acid, monochloracetic acid or the corresponding fluoracetic acid. Salt formation may or may not take place. However, the relative toxicity to the various plants of different classes is not substantially changed by the addition of the strong organic acid, and it is, therefore, not intended that the present invention be limited with respect to any theory as to the existence or nonexistence of salt formation with respect to the compounds covered by the appended claims.

The following preparations are illustrative of the various methods of preparing the compounds of this invention. All parts and percentages are by weight.

METHOD A

*(Reactions 13 and 18)*

A solution of 23.5 parts of concentrated sulfuric acid and 6.5 parts water was added dropwise over about two hours to a well-stirred mixture of 28.2 parts of norbornylene, 29.1 parts crushed potassium thiocyanate and 130 parts toluene at 35–40° C. The reaction was completed by continuing the stirring at 35–40° C. for an additional 3 hours. After further standing for 16 hours, 250 parts water was added and the organic layer was separated from the aqueous layer, washed with water and dried over sodium sulfate. The solvent was distilled off, the product distilled to recover 22.15 parts 2-norbornyl isothiocyanate boiling at 74–80° C./0.3 mm.

A mixture of 4.6 parts 2-norbornyl isothiocyanate, 58.5 parts absolute alcohol and 7.2 parts 25% aqueous dimethylamine solution was refluxed (80° C. pot temperature) for 5 hours. The volatile solvent was then distilled off under reduced pressure leaving a residue which was recrystallized from absolute alcohol. The crystalline 1,1-dimethyl-3-(2-norbornyl) - 2 - thiourea amounting to 4.5 parts thus obtained melted at 95–98° C. A repetition of this process without distilling the 2-norbornyl isothiocyanate gave a satisfactory product in 90% of theoretical yield.

METHOD B

*(Reactions 3 and 19)*

To 120 parts 98% sulfuric acid at −5° C. was added dropwise with stirring 12.85 parts 5-chloronorbornylene over a 30-minute period. Then 8.7 parts ethyl thiocyanate was added dropwise with stirring at −5° C. for 30 minutes. After further standing at 0° C. for 16 hours, this mixture was poured into 800 parts ice and water. The solid which separated was dissolved in benzene, washed twice with water and dried over sodium sulfate. The S-ethyl-5 or 6-chloro-2-norbornyl thiolcarbamate recovered by distilling off the benzene amounted to 14.9 parts and melted at 59–65° C. To this was added 200 parts absolute alcohol and 54 parts 25% aqueous dimethylamine and the resulting mixture was heated at about 80° C. for 5 hours. This reaction mixture after cooling was poured into 800 parts of water and the solid which separated was filtered and dried. The solid 1-(chloro-2-norbornyl)-3,3-dimethylurea after crystallization from ethanol melted at 175–178° C.

METHOD C

*(Reactions 1, 12, 14 and 20)*

To 980 parts glacial acetic acid at 20° C. was added 529.5 parts dicyclopentadiene and then 293 parts potassium cyanide while keeping the temperature below 30° C. To this mixture was added dropwise at 30° C. a mixture of 1,800 parts concentrated sulfuric acid in 975 parts glacial acetic acid. After 5 hours at 30° C. the mixture was cooled to 25° C. and poured into ice water. The oil that separated was extracted with benzene, washed with water, and dried over sodium sulfate. The benzene was distilled off under reduced pressure to recover 692 parts crude dihydrodicyclopentadienyl formamide as a viscous, dark liquid.

The dihydrodicyclopentadienyl formamide was added to 500 parts potassium hydroxide in 3000 parts ethylene glycol and heated at 140–160° C. for 12 hours. This mixture was then poured into water and extracted with benzene to recover crude dihydrodicyclopentadienylamine which was subsequently distilled to recover 221.7 parts partially purified dihydrodicyclopentadienylamine boiling at 88–98° C./2.5 mm. pressure.

This amine was then dissolved in about 250 parts benzene and extracted first with 500 parts 10% aqueous hydrochloric acid and then with 100 parts aqueous 10% hydrochloric acid. The acid extracts were combined and neutralized with a 20% sodium hydroxide solution and the amine which was liberated was taken up in benzene, washed with water and dried. The amine was then recovered by distilling off the benzene. There was thus obtained 25.4 parts clear water-white dicyclopentadienylamine which analyzed 8.3% N (9.4% N calculated for pure dihydrodicyclopentadienylamine).

The amine hydrochloride was prepared by dissolving 22 parts dihydrodicyclopentadienylamine in 200 parts xylene and adding 6 parts hydrogen chloride. The amine salt separated and 30 parts phosgene was bubbled into the slurry while heating at 125–128° C. until a clear solution was obtained. The solvent was removed under reduced pressure and the residue was distilled under reduced pressure whereby there was recovered 18 parts dihydrodicylclopentadienyl isocyanate boiling at 125–133° C./18 mm. having an $n_D^{20}=1.5162$.

To 1.5 parts anhydrous dimethylamine in 16 parts hexane was added dropwise 4 parts dihydrodicyclopentadienyl isocyanate while cooling at −5 to −15° C. while stirring. A white solid, which separated, was removed by filtration and dried in air and identified as 1,1-dimethyl-3-dihydrodicyclopentadienyl urea amounted to 4.9 parts. The crude material which melted at 146–7° C. on recrystallization from benzene melted at 151–3° C.

METHOD D

*(Reactions 5, 13, 14 and 20)*

To 1400 parts of concentrated hydrochloric acid was added 142 parts of ethyl-2-norbornyl isothiocyanate (prepared from HSCN and 5-ethylnorbornylene as in Method A), 1 part of Triton X100 and 0.01 part of Anti-foam A (Dow-Corning). The mixture was stirred at reflux (110° C.) for 30 hours. It was then diluted with benzene and water. The aqueous layer was separated, made basic by addition of NaOH, and extracted with benzene. The benzene extract was dried over $Na_2SO_4$ and then distilled at reduced pressure. A fraction of 62.5 parts of water-white liquid was collected at 38–40° C. at 0.8 mm. pressure. It analyzed neutral equivalent (molecular weight by acid titration) 140.6 as compared to a calculated value of 139.

This amine was converted to the isocyanate as in Method C. The isocyanate was a water-white liquid of boiling point 50–55° C. at 0.6 mm. pressure. It was reacted with dimethylamine as in Method C to give the 1,1-dimethyl-3-(ethyl-2-norbornyl) urea as a white powder which analyzed 13.2% N compared to a calculated value of 13.3% N.

METHOD E

*(Reactions 6, 13, 14 and 20)*

To 30 parts of 2-norbornyl isothiocyanate (prepared as in Method A) in 200 parts of gl. acetic acid at 20–30° C. was added 28 parts of chlorine gas with stirring over a 30-minute period. The acetic acid was distilled off at reduced pressure up to a pot temperature of 50° C. at 30 mm. The white solid residue was diluted with hexane, filtered off, washed with hexane, and dried. Twenty-six parts of white crystalline powder was obtained. It analyzed 9.6% N and 22.8% Cl compared to the calculated values of 9.5% N and 24.1% Cl for norbornylammonium chloride. To 250 parts of water at 60° C. was added 24.5 parts of norbornylammonium chloride. The resulting solution was filtered to remove 0.3 part of brown insoluble material. The filtrate was made basic with NaOH, and extracted twice with 160 parts each of benzene. The benzene extracts were combined, dried over $Na_2SO_4$, and distilled. Twelve parts of water-white liquid was collected at 55–56° C. at 25 mm. pressure. It had a neutral equivalent of 111.9 compared to a calculated value of 111.5 for 2-norbornylamine. The amine was converted to the isocyanate as in Method C. Alternatively, the 2-norbornylammonium chloride can itself be reacted with phosgene to give the isocyanate. The isocyanate was a water-white liquid of boiling point 80–83° C. at 28 mm. pressure. It was reacted with dimethylamine as in Method C to give 1,1-dimethyl-3-(2-norbornyl)urea.

METHOD F

*(Reactions 5, 13, 14, 20)*

To 1341 parts of dihydrodicyclopentadienyl isothiocyanate (prepared from HSCN and dicyclopentadiene as in Method A) was added 560 parts of concentrated aqueous ammonia. Ammonia gas was bubbled into the stirred mixture while 780 parts of ethanol was added slowly. The temperature was held at 45 to 50° C. by cooling. Stirring and $NH_3$ addition was continued for 6 hours. A heavy white slurry formed. It was poured into ice water. The white precipitate was filtered out, washed with water, and with hexane, and dried. One thousand four hundred fifty-one (1451) parts of white powder was obtained. It was hexahydro-4,7-methanoindenyl thiourea.

To 2500 parts of ethylene glycol was added 720 parts of KOH and 958 parts of the above thiourea. The mixture was stirred at 140° C. for 11 hours, cooled, and diluted with benzene and water. The benzene layer was separated, washed with water, and dried over $Na_2SO_4$. The material was then distilled at reduced pressure. Four hundred seventy-three (473) parts of yellow liquid was collected at 72° to 76° C. at 1.25 mm. pressure. It was dihydrodicyclopentadienyl amine and analyzed 9.2% N and had an $n_D^{20}$ of 1.5281. The calculated value is 9.4% N. The amine was converted to the isocyanate as in Method C. The isocyanate (9 parts) was reacted with diethylamine (4 parts) in 50 ml. of hexane to give 10 parts of white powder—1,1-diethyl-3-[5-(3a,4,5,6,7,7a-hexahydro-4,7-methanoindenyl)]urea. It analyzed 11.2% N compared to the calculated value of 11.2% N.

METHOD G

*(Reactions 2, 8, 15, 21)*

2-cyanobicyclo[2.2.1]-5-heptene (boiling point 61° to 67° C. at 3 mm. pressure) was hydrogenated in methylcyclohexane solution with liquid ammonia present and using Raney Ni catalyst. The reaction mixture was filtered to remove catalyst and then distilled at reduced pressure. A fraction of water-white liquid was collected at 85° to 91° C. (mostly 89° C.) at 33 mm. pressure. It analyzed 10.4% N and had an $n_D^{20}$ of 1.4870 and a neutral equivalent of 129. The calculated values of 11.3% N and 125 neutral equivalent for 2-norbornylmethylamine. This amine was converted to the isocyanate as in Method C. It was a water-white liquid which boiled at 60° C. at 1.0 mm. pressure. Ten parts of this isocyanate was reacted with 2 parts of methylamine gas in 40 parts of hexane as in Method C. Ten and one-tenth (10.1) parts of white powder was obtained—1-(bicyclo[2.2.1]-heptylmethyl)-3-methylurea. It analyzed 15.1% N compared to the calculated value of 15.4% N.

METHOD H

*(Reactions 2, 8, 16, 22)*

To 20 parts of NaOH in 150 parts of water was added 39 parts of carbon disulfide. Then over a 30-minute period with stirring 61 parts of norbornylmethylamine (prepared as in Method G) was added dropwise. The temperature rose to 60° C. The mixture was then stirred at 85° to 90° C. for 2 hours and cooled to 35–40° C. Then over a one-hour period 53 parts of ethyl chloroformate was added dropwise with stirring at 35–40° C. The mixture was stirred for an additional 30 minutes at 40° C. after the addition was complete. It was then diluted with 80 parts of benzene. The benzene layer was separated, washed with water, dried over $Na_2SO_4$, and distilled. A fraction of 51 parts of water-white liquid was collected at 85° to 90° C. at 0.8 mm. pressure. It was 2-norbornylmethyl isothiocyanate.

To 8 parts of this isocyanate in 40 parts of hexane at 5° to 10° C. was added slowly 4.3 parts of methyl n-butylamine. An exothermic reaction took place, but no precipitate formed. The hexane was then distilled off on the water pump, leaving 10.6 parts of very viscous yellow liquid. It was 1-butyl-1-methyl-3-(2-norbornylmethyl)thiourea. It analyzed 10.5% N compared to the calculated value of 10.9% N.

METHOD I

*(Reactions 4, 10, 17, and 21)*

To 31 parts of bicyclo[2.2.1]-5-heptenylmethyl amine prepared by Reaction 4 in 800 ml. of $CHCl_3$ was added 9.3 parts of gaseous HCl at 25° to 30° C. Then at 50°–60° C. where the amine hydrochloride was in solution, 18 parts of chlorine was added with stirring over a 20-minute period. The solution was then evaporated down in a stream of air on the steam bath. The white paste that remained was diluted with hexane and filtered. The filter cake was washed with hexane and dried in a vacuum desiccator. The dried white powder weighed 48 parts analyzed 6.2% N and 42.5% Cl. The calculated values for dichlorobicyclo[2.2.1]heptylmethylammonium chloride are 6.1% N and 46.0% Cl. This material was converted to the isocyanate as in Method C. The isocyanate was a viscous yellow liquid of boiling point 120° to 127° C. at 0.5 mm. pressure. Six parts of this isocyanate was reacted with 1.5 parts of dimethylamine in 24 parts of hexane at 0 to 10° C. A very viscous red liquid separated. The hexane was distilled off on the water pump, leaving 6.5 parts of very viscous red liquid which upon standing became a red brittle glass. It analyzed 10.3% N and 25.2% Cl compared to the calculated values of 10.5% N and 26.6% Cl for N,N-dimethyl-N′-(5,6-dichloronorbornylmethyl)urea.

Examples

Testing of the compounds of this invention for herbicidal activity was carried out by preparing an aqueous suspension containing 15 g. active compound per liter and spraying at the rate of 80 gallons per acre for a 10 lb. per acre test on soil containing seeds which had been planted 24 hours earlier. A double spraying was used for 20 lb. per acre test and a proportionately more dilute solution was used for the lower rates. The aqueous suspensions were made by dissolving the compound in acetone to a concentration of 15 g. per 200 cc. acetone solution, adding Tween 20 (a sorbitol monolaurate polyoxyethylene derivative) to a concentration of 10 g. per 200 cc. of the acetone solution and diluting the acetone solution with water to bring the concentration to 15 g. active compound per liter. The seeds used in these tests were as follows:

| Common name: | Scientific name |
|---|---|
| A-Millet | Setaria sp. |
| B-Corn | Zea mays |
| C-Curled Mustard | Brassica juncea |
| D-Cotton | Gossypium hirsutum |
| E-Crabgrass | Digitaria sp. |
| F-Wild Oats | Avena fatua |
| G-Peas | Pisum sativum |
| H-Buckwheat | Fagopyrum esculentum |
| I-Sunflower | Helianthus annuus |
| J-Cucumber | Cucumis sativus |
| K-Sugarbeet | Beta vulgaris |
| L-Soybean | Soja max |
| M-Alfalfa | Medicago sativa |
| N-Onion | Allium cepa |
| O-Flax | Linum usitatissimum |
| P-Pigweed | Amaranthus retroflexus |
| Q-Snapbean | Phaseolus vulgaris |
| R-Tomato | Lycopersicum esculentum |
| S-Carrot | Dacus carota |
| T-Ragweed | Ambrosia artemisulfolia |
| U-Yellow Foxtail | Setaria lutescens |
| V-Wild Mustard | Brassica arvensis |
| W-Sudan Grass | Sorghum sudanensis |
| X-Peanut | Arachis hypogaea |

In Table 1 tabulations below are given soil germination results for millet, corn, mustard and cotton. The numerical values are based on a 0–10 rating scale in which 0 means no damage to the plants and 10 indicates complete kill of the plants.

TABLE 1

| No. | R, $R^1$ | $R^2$, $R^3$ | n | X | $R^4$, $R^5$ | Lb./acre | Plants Tested | | | |
|---|---|---|---|---|---|---|---|---|---|---|
| | | | | | | | A | B | C | D |
| 1 | —H, —H | —H, —H | 1 | S | —$CH_3$, —$CH_3$ | 2 | 1 | 1 | 8 | 0 |
| 2 | —H, —H | —H, —H | 1 | O | —$C_2H_5$, —$C_2H_5$ | 2 | 1 | 1 | 9 | 0 |
| 3 | —H, —H | —H, —H | 1 | O | —$CH_3$, —$CH_3$ | 2 | 7 | 5 | 10 | 0 |
| 4 | —H, —H | —H, —H | 1 | O | —H, —$CH_3$ | 2 | 2 | 0 | 8 | 0 |
| 5 | —H, —H | —H, —H | 1 | O | —H, —$C_2H_5$ | 2 | 4 | 0 | 9 | 0 |
| 6 | —H, —H | —H, —H | 0 | O | —H, —$CH_3$ | 20 | 9 | 6 | 10 | 10 |
| 7 | —H, —H | —H, —H | 0 | O | —$CH_3$, —$CH_3$ | 4 | 9 | 9 | 10 | 8 |
| 8 | —H, —H | —H, —H | 0 | O | —$C_2H_5$, —$C_2H_5$ | 20 | 10 | 9 | 10 | 10 |
| 9 | —H, —H | —H, —H | 0 | O | —H, —$C_2H_5$ | 2 | 6 | 3 | 10 | 5 |
| | | | | | | 20 | 6 | 4 | 10 | 9 |

TABLE I—Continued

| No. | R, R¹ | R², R³ | n | X | R⁴, R⁵ | Lb./acre | Plants Tested A | B | C | D |
|---|---|---|---|---|---|---|---|---|---|---|
| 10 | —H, —H | —H, —H | 0 | O | —C₃H₇i, —C₃H₇(i) | 20 | 6 | 3 | 10 | 2 |
| 11 | —H, —H | —H, —H | 0 | O | —C₃H₇n, —C₃H₇(n) | 20 | 5 | 2 | 10 | 0 |
| 12 | —H, —H | —H, —H | 0 | O | —H, —C₃H₇n | 20 | 6 | 1 | 10 | 9 |
| 13 | —H, —H | —H, —H | 0 | O | —H, —C₃H₇(i) | 20 | 7 | 1 | 10 | 0 |
| 14 | —H, —H | —H, —H | 0 | O | —C₄H₉, —CH₃ | 20 | 9 | 8 | 10 | 6 |
| 15 | —H, —H | —H, —H | 0 | O | —H, —CH₂CH=CH₂ | 20 | 2 | 2 | 9 | 5 |
| 16 | —H, —H | —H, —H | 0 | O | —CH₂CH=CH₂, —CH₂CH=CH₂ | 20 | 5 | 2 | 10 | 0 |
| 17 | —H, —Cl | —H, —H | 0 | O | —CH₃, —CH₃ | 1 | 1 | 2 | 10 | 2 |
|    |         |         |   |   |                | 4 | 9 | 5 | 10 | 6 |
| 18 | —H, —Cl | —H, —H | 0 | O | —H, —C₂H₅ | 20 | 8 | 9 | 10 | 8 |
| 19 | —H, —Cl | —H, —H | 0 | O | —C₂H₅, —C₂H₅ | 20 | 10 | 10 | 10 | 10 |
| 20 | —H, —Cl | —H, —H | 0 | O | —H, —C₃H₇(n) | 20 | 6 | 5 | 10 | 4 |
| 21 | —H, —Cl | —H, —H | 0 | O | —C₃H₇(n), —C₃H₇(n) | 20 | 0 | 0 | 10 | 0 |
| 22 | —H, —Cl | —H, —H | 0 | O | —H, —C₃H₇(i) | 20 | 6 | 4 | 10 | 10 |
| 23 | —H, —Cl | —H, —H | 0 | O | —C₃H₇(i), —C₃H₇(i) | 20 | 4 | 0 | 10 | 6 |
| 24 | —H, —Cl | —H, —H | 0 | O | —CH₃, —C₄H₉(n) | 20 | 9 | 9 | 10 | 4 |
| 25 | —H, —Cl | —H, —H | 0 | O | —H, —CH₂CH=CH₂ | 20 | 6 | 7 | 10 | 6 |
| 26 | —H, —Cl | —H, —H | 0 | O | —CH₂CH=CH₂, —CH₂CH=CH₂ | 20 | 3 | 2 | 10 | 0 |
| 27 | —H, —Cl | —H, —H | 0 | O | —H, —C₄H₉(n) | 20 | 9 | 7 | 10 | 1 |
| 28 | —CH=CH·CH₂— | —H, —H | 0 | O | —H, —CH₃ | 20 | 8 | 7 | 10 | 3 |
| 29 | —CH=CH·CH₂— | —H, —H | 0 | O | —CH₃, —CH₃ | 2 | 10 | 5 | 10 | 0 |
| 30 | —CH=CH·CH₂— | —H, —H | 0 | O | —H, —C₂H₅ | 20 | 3 | 4 | 10 | 3 |
| 31 | —CH=CH·CH₂— | —H, —H | 0 | O | —C₂H₅, —C₂H₅ | 2 | 4 | 3 | 9 | 0 |
| 32 | —CH=CH·CH₂— | —H, —H | 0 | O | —H, —C₃H₇(n) | 20 | 0 | 0 | 7 | 0 |
| 33 | —CH=CH·CH₂— | —H, —H | 0 | O | —H, —C₃H₇(i) | 20 | 2 | 3 | 10 | 0 |
| 34 | —CH=CH·CH₂— | —H, —H | 0 | O | —C₃H₇(i), —C₃H₇(i) | 20 | 2 | 0 | 0 | 0 |
| 35 | —CH=CH·CH₂— | —H, —H | 0 | O | —CH₃, —C₄H₉(n) | 20 | 7 | 6 | 10 | 0 |
| 36 | —CH=CH·CH₂— | —H, —H | 0 | O | —H, —C₄H₉(n) | 20 | 3 | 2 | 3 | 2 |
| 37 | —CH=CH·CH₂— | —H, —H | 0 | O | —H, —C₄H₉(t) | 20 | 4 | 3 | 0 | 0 |
| 38 | —CH=CH·CH₂— | —H, —H | 0 | O | —H, —CH₂CH=CH₂ | 20 | 3 | 3 | 8 | 0 |
| 39 | —CH=CH·CH₂— | —H, —H | 0 | O | —CH₂—CH=CH₂, —CH₂CH=CH₂ | 20 | 1 | 0 | 6 | 0 |
| 40 | —H, —H | —H, —H | 0 | S | —CH₃, —CH₃ | 20 | 7 | 4 | 10 | 5 |
| 41 | —H, —H | —H, —H | 0 | S | —C₂H₅, —C₂H₅ | 20 | 9 | 5 | 10 | 10 |
| 42 | —H, —H | —H, —H | 0 | S | —H, —C₃H₇(n) | 20 | 0 | 0 | 9 | 0 |
| 43 | —H, —H | —H, —H | 0 | S | —H, —C₃H₇(i) | 20 | 4 | 1 | 10 | 0 |
| 44 | —H, —H | —H, —H | 0 | S | —C₃H₇(i), —C₃H₇(i) | 20 | 4 | 0 | 9 | 5 |
| 45 | —H, —H | —H, —H | 0 | S | —C₃H₇(n), —C₃H₇(n) | 20 | 0 | 0 | 8 | 0 |
| 46 | —H, —H | —H, —H | 0 | S | —H, —C₄H₉(n) | 20 | 5 | 1 | 5 | 2 |
| 47 | —H, —Cl | —H, —H | 0 | S | —CH₃, —CH₃ | 20 | 8 | 7 | 10 | 9 |
| 48 | —H, —Cl | —H, —H | 0 | S | —C₂H₅, —C₂H₅ | 20 | 9 | 7 | 10 | 8 |
| 49 | —H, —Cl | —H, —H | 0 | S | —H, —C₂H₅ | 20 | 3 | 2 | 10 | 1 |
| 50 | —H, —Cl | —H, —H | 0 | S | —H, —CH₃ | 20 | 4 | 4 | 10 | 5 |
| 51 | —H, —Cl | —H, —H | 0 | S | —H, —C₃H₇(i) | 20 | 5 | 1 | 10 | 3 |
| 52 | —H, —Cl | —H, —H | 0 | S | —H, —C₃H₇(n) | 20 | 4 | 3 | 9 | 0 |
| 53 | —H, —Cl | —H, —H | 0 | S | —C₃H₇(i), —C₃H₇(i) | 20 | 3 | 0 | 6 | 0 |
| 54 | —CH=CH·CH₂— | —H, —H | 0 | S | —CH₃, —CH₃ | 20 | 10 | 10 | 10 | 10 |
| 55 | —CH=CH·CH₂— | —H, —H | 0 | S | —H, —CH₃ | 20 | 1 | 3 | 10 | 0 |
| 56 | —CH=CH·CH₂— | —H, —H | 0 | S | —C₂H₅, —C₂H₅ | 10 | 4 | 5 | 10 | 3 |
| 57 | —CH=CH·CH₂— | —H, —H | 0 | S | —H, —C₃H₇(n) | 20 | 1 | 0 | 3 | 0 |
| 58 | —CH=CH·CH₂— | —H, —H | 0 | S | —H, —C₃H₇(i) | 20 | 0 | 0 | 8 | 0 |
| 59 | —CH=CH·CH₂— | —H, —H | 0 | S | —C₃H₇(i), —C₃H₇(i) | 20 | 0 | 0 | 1 | 0 |
| 60 | —H, —CH₂Cl | —H, —H | 0 | S | —CH₃, —CH₃ | 20 | 8 | 6 | 10 | 6 |
| 61 | —H, —CH₂Cl | —H, —H | 0 | S | —H, —CH₃ | 20 | 0 | 0 | 7 | 0 |
| 62 | —H, —CH₂Cl | —H, —H | 0 | S | —C₂H₅, —C₂H₅ | 20 | 2 | 5 | 0 | 0 |
| 63 | —CH₂CH₂CH₂— | —H, —H | 0 | S | —CH₃, —CH₃ | 20 | 10 | 6 | 10 | 1 |
| 64 | —CH₂CH₂CH₂— | —H, —H | 0 | O | —CH₃, —CH₃ | 20 | 10 | 10 | 10 | 10 |
| 65 | —CH₃, —CH₃ | —H, —H | 0 | S | —CH₃, —CH₃ | 20 | 10 | 10 | 10 | 8 |
|    |            |         |   |   |             | 2 | 6 | 0 | 2 | 0 |
| 66 | —H, —CH₃ | —H, —H | 0 | S | —CH₃, —CH₃ | 20 | 10 | 10 | 10 | 9 |
| 67 | —H, —CH₃ | —H, —H | 0 | S | —C₂H₅, —C₂H₅ | 20 | 10 | 0 | 10 | 7 |
| 68 | —H, —OC₂H₅ | —H, —H | 0 | S | —CH₃, —CH₃ | 20 | 10 | 7 | 10 | 6 |
| 69 | —H, —OCH₃ | —H, —H | 0 | S | —C₂H₅, —C₂H₅ | 20 | 7 | 4 | 10 | 7 |
| 70 | —H, —OCH₃ | —H, —H | 0 | S | —CH₃, —CH₃ | 20 | 10 | 3 | 10 | 1 |
| 71 | —H, —CN | —H, —H | 0 | S | —CH₃, —CH₃ | 20 | 8 | 6 | 10 | 7 |
| 72 | —CH₂CH₂CH₂— | —H, —H | 0 | O | —CH₃, —CH₃ | 4 | 1 | 2 | 8 | 1 |
| 73 | —CH₂CH₂CH₂— | —H, —H | 0 | O | —C₂H₅, —C₂H₅ | 20 | 5 | 3 | 10 | 2 |
| 74 | —CH₂CH₂CH₂— | —H, —H | 0 | S | —H, —CH₃ | 20 | 1 | 0 | 8 | 0 |
| 75 | —CH₂CH₂CH₂— | —H, —H | 0 | O | —CH₃, —C₄H₉(n) | 20 | 5 | 7 | 9 | 5 |
| 76 | —CH₂CH₂CH₂— | —H, —H | 0 | O | —C₂H₅, —C₂H₅ | 20 | 9 | 8 | 10 | 2 |
| 77 | —CH₂CH₂CH₂— | —H, —H | 0 | O | —H, —CH₃ | 10 | 2 | 4 | 10 | 5 |
| 78 | —CH₂CH₂CH₂— | —H, —H | 0 | O | —C₂H₅, —C₂H₅ | 20 | 4 | 0 | 10 | 3 |
| 79 | —C₂H₅, —CH₃ | —H, —H | 0 | S | —CH₃, —CH₃ | 20 | 10 | 10 | 10 | 6 |
| 80 | —OC₄H₉(n), —H | —H, —H | 0 | S | —CH₃, —CH₃ | 20 | 3 | 5 | 10 | 0 |
| 81 | —C₃H₇(n), —H | —H, —H | 0 | O | —CH₃, —CH₃ | 20 | 0 | 4 | 10 | 0 |
| 82 | —CH₃, —H | —H, —H | 0 | O | —C₂H₅, —C₂H₅ | 20 | 10 | 9 | 10 | 10 |
|    |           |         |   |   |               | 2 | 8 | 3 | 10 | 4 |
| 83 | —CH₃, —H | —H, —H | 0 | O | —H, —CH₃ | 20 | 9 | 5 | 10 | 9 |
|    |           |         |   |   |              | 2 | 4 | 2 | 10 | 3 |
| 84 | —CH₃, —H | —H, —H | 0 | O | —CH₃, —CH₃ | 20 | 10 | 10 | 10 | 10 |
|    |           |         |   |   |               | 2 | 10 | 4 | 10 | 4 |
| 85 | —CH₃, —CH₃ | —H, —H | 0 | O | —CH₃, —CH₃ | 20 | 10 | 10 | 10 | 10 |
|    |             |         |   |   |              | 2 | 10 | 8 | 10 | 7 |
| 86 | —CH₃, —CH₃ | —H, —H | 0 | O | —C₂H₅, —C₂H₅ | 20 | 10 | 8 | 10 | 8 |
|    |             |         |   |   |                | 2 | 5 | 2 | 10 | 2 |
| 87 | —Cl, —CH₃ | —H, —H | 0 | S | —CH₃, —CH₃ | 20 | 10 | 5 | 10 | 10 |
| 88 | —Cl, —CH₃ | —H, —H | 0 | O | —CH₃, —CH₃ | 20 | 10 | 8 | 10 | 10 |
|    |            |         |   |   |               | 2 | 10 | 5 | 10 | 1 |
| 89 | —C₂H₅, —H | —H, —H | 0 | O | —CH₃, —CH₃ | 20 | 10 | 10 | 10 | 10 |
|    |            |         |   |   |               | 2 | 8 | 2 | 10 | 1 |
| 90 | —Cl, —Cl | —H, —H | 0 | O | —CH₃, —CH₃ | 2 | 5 | 0 | 10 | 2 |
| 91 | —C₂H₅, —H | —H, —H | 0 | O | —C₂H₅, —C₂H₅ | 20 | 10 | 6 | 10 | 4 |
| 92 | —C₂H₅, —H | —H, —H | 0 | O | —CH₃, —C₄H₉(n) | 20 | 9 | 7 | 10 | 9 |
| 93 | —C₂H₅, —H | —H, —H | 0 | O | —H, —CH₃ | 20 | 2 | 1 | 10 | 6 |
| 94 | —CHClCHClCH₂— | —H, —H | 0 | O | —CH₃, —CH₃ | 20 | 9 | 5 | 10 | 1 |
| 95 | —CHClCHClCH₂— | —H, —H | 0 | O | —CH₃, —CH₃ | 20 | 8 | 6 | 9 | 1 |
| 96 | —CHClCHClCH₂— | —H, —H | 0 | O | —C₂H₅, —C₂H₅ | 20 | 9 | 1 | 10 | 0 |
| 97 | —CHClCHClCH₂— | —H, —H | 0 | O | —H, —CH₃ | 20 | 0 | 0 | 9 | 0 |
| 98 | —C₆H₅, —H | —H, —H | 0 | O | —CH₃, —CH₃ | 20 | 7 | 4 | 10 | 0 |

TABLE I—Continued

| No. | R, R¹ | R², R³ | n | X | R⁴, R⁵ | Lb./acre | Plants Tested | | | |
|---|---|---|---|---|---|---|---|---|---|---|
| | | | | | | | A | B | C | D |
| 99 | —H, —H | —CH₃, —H | 1 | O | —CH₃, —CH₃ | 2 / 20 | 1 / 8 | 2 / 8 | 10 / 10 | 2 / 10 |
| 100 | —H, —H | —H, —CH₃ | 1 | O | —CH₃, —CH₃ | 2 / 20 | 2 / 10 | 3 / 6 | 10 / 10 | 2 / 9 |
| 101 | —Cl, —H | —H, —H | 0 | O | —CH₃, —OCH₃ | 2 / 20 | 5 / 10 | 2 / 8 | 10 / 10 | 7 / 10 |
| 192 | —CH=CH—CH₂— | —H, —H | 0 | O | —CH₃, —OCH₃ | 2 / 20 | 0 / 10 | 2 / 8 | 10 / 10 | 0 / 2 |
| 103 | —CH=CH—CH₂— | —H, —H | 0 | S | —CH₃, —OCH₃ | 2 / 20 | 0 / 7 | 0 / 0 | 5 / 10 | 0 / 0 |

Data showing variation of selectivity with rate of application in lb./acre in a foliage spray test are listed in Table 2 for No. 7, 1,1-dimethyl-3-(2-norbornyl)urea, No. 17, 1-1-dimethyl-3-(2-[5 or 6-chloronorbornyl])urea, No. 29, 1-1-dimethyl-3-(dihydrodicyclopentadienyl)urea, No. 40, 1,1-dimethyl-3-(2-norbornyl)thiourea and No. 47, 1,1-dimethyl-3-(2-[5 or 6-chloronorbornyl])-2-thiourea and No. 54, 1,1-dimethyl-3-[5-(3a,4,5,6,7,7a-hexahydro-4,7-methanoindenyl)]-2-thiourea where the results are expressed as above where 0 indicates no damage to the plant and 10 indicates complete kill. These tests are foliage spray tests and are carried out on plants in the first to second true leaf stage of their growth.

The compounds of this invention are used in compositions for use as herbicides in liquid or solid form. Solutions of the compounds, for example, may be used as liquids in solvents such as cyclohexanol, furfural, isobutyl alcohol, cyclohexanone, isopropyl acetate, and acetone and applied directly to the soil in which plants normally grow, or to the plants themselves, or to mixtures of seeds of desirable and undesirable plants. The compounds in solid form or solutions thereof in any of the abovementioned solvents may be admixed with water using a suitable emulsifying agent to form an aqueous emulsion or suspension which is used as the carrier of a herbicide composition. The solid compound or liquid

TABLE 2

| Compound No | 40 | | | 47 | | | 54 | | | 7 | | | 17 | | | 29 | | |
|---|---|---|---|---|---|---|---|---|---|---|---|---|---|---|---|---|---|---|
| Lb./Acre | 1 | 3.3 | 10 | 1 | 3.3 | 10 | 1 | 3.3 | 10 | 1 | 2 | 4 | 1 | 2 | 4 | 1 | 2 | 4 |
| Plant Species: | | | | | | | | | | | | | | | | | | |
| A—Millet | 0 | 2 | 7 | 0 | 1 | 7 | 1 | 2 | 9 | 7 | 7 | 9 | 5 | 6 | 6 | 4 | 8 | 10 |
| B—Corn | | | | | | | | | | 0 | 3 | 8 | 1 | 3 | 9 | 0 | 4 | 5 |
| C—Curled Mustard | 6 | 9 | 10 | 9 | 10 | 10 | 7 | 10 | 10 | 10 | 10 | 10 | 10 | 10 | 10 | 9 | 9 | 10 |
| D—Cotton | 0 | 0 | 3 | 0 | 2 | 3 | 0 | 0 | 0 | 2 | 3 | 5 | 3 | 4 | 7 | 0 | 0 | 0 |
| E—Crabgrass | 3 | 4 | 9 | 3 | 6 | 10 | 4 | 9 | 10 | 5 | 9 | 10 | 7 | 9 | 10 | 9 | 10 | 10 |
| F—Wild Oats | 0 | 1 | 4 | 0 | 1 | 7 | 0 | 1 | 5 | 3 | 6 | 9 | 2 | 4 | 10 | 0 | 0 | 4 |
| G—Peas | 0 | 0 | 3 | 0 | 0 | 3 | 0 | 1 | 8 | 3 | 3 | 4 | 3 | 5 | 7 | 0 | 0 | 0 |
| H—Buckwheat | 1 | 4 | 4 | 1 | 5 | 8 | 0 | 5 | 10 | 9 | 9 | 9 | 6 | 9 | 10 | 4 | 6 | 8 |
| I—Sunflower | 0 | 0 | 1 | 0 | 2 | 5 | 0 | 0 | 4 | 1 | 4 | 5 | 3 | 6 | 7 | 3 | 3 | 5 |
| J—Cucumber | 0 | 7 | 10 | 3 | 8 | 10 | 3 | 9 | 10 | 8 | 10 | 10 | 9 | 10 | 10 | 4 | 9 | 9 |
| K—Sugarbeet | 1 | 4 | 8 | 4 | 7 | 10 | 1 | 8 | 10 | 5 | 9 | 9 | 6 | 10 | 10 | 10 | 9 | 9 |
| L—Soybean | 0 | 0 | 0 | 0 | 0 | 4 | 0 | 0 | 1 | 0 | 1 | 3 | 0 | 5 | 8 | 0 | 0 | 0 |
| M—Alfalfa | 7 | 10 | 10 | 9 | 10 | 10 | 1 | 10 | 10 | 10 | 10 | 10 | 10 | 10 | 10 | 10 | 10 | 10 |
| N—Onion | 0 | 0 | 4 | 3 | 10 | 10 | 4 | 9 | 10 | 0 | 2 | 9 | 8 | 9 | 10 | 10 | 10 | 10 |
| O—Flax | 0 | 7 | 10 | 6 | 10 | 10 | 6 | 8 | 10 | 5 | 9 | 10 | 9 | 10 | 10 | 5 | 8 | 9 |
| P—Pigweed | 5 | 7 | 10 | 5 | 10 | 10 | 8 | 10 | 10 | 10 | 10 | 10 | 10 | 10 | 10 | 7 | 9 | 10 |
| Q—Snapbean | | | | | | | | | | 1 | 3 | 5 | 2 | 4 | 5 | 0 | 0 | 1 |
| R—Tomato | 0 | 3 | 10 | 4 | 9 | 10 | 3 | 6 | 10 | 3 | 5 | 9 | 7 | 10 | 10 | 9 | 9 | 10 |
| S—Carrot | 1 | 3 | 10 | 6 | 9 | 10 | 3 | 9 | 10 | 3 | 6 | 9 | 4 | 4 | 10 | 10 | 10 | 10 |
| T—Ragweed | 3 | 4 | 10 | 2 | 8 | 10 | 4 | 7 | 10 | 7 | 10 | 10 | 5 | 5 | 9 | 3 | 8 | 10 |
| U—Yellow Foxtail | 0 | 3 | 6 | 0 | 3 | 9 | 2 | 9 | 10 | 4 | 8 | 9 | 2 | 2 | 7 | 8 | 9 | 10 |
| V—Wild Mustard | 2 | 10 | 10 | 9 | 10 | 10 | 9 | 10 | 10 | 10 | 10 | 10 | 10 | 10 | 10 | 10 | 10 | 10 |
| W—Sudan Grass | 0 | 2 | 3 | 0 | 3 | 8 | 0 | 4 | 9 | 2 | 3 | 4 | 2 | 5 | 5 | | | |
| X—Peanut | | | | | | | | | | 0 | 2 | 4 | 2 | 3 | 5 | 0 | 0 | 1 |

As examples of the use of compounds of the present invention with strong organic acids, equimolecular amounts of trichloracetic acid and one of the ureas of this invention were dissolved in xylene to form about a 10% solution, the solvent was recovered and an emulsion was made as for the urea compounds alone, and the emulsion in each case was tested in the soil germination test. In Table 3 are shown the results of such tests.

compound with solvent may also be extended by admixing with a solid carrier to form a dust which is used as a herbicidal composition, or the dust may be further extended by mixing with water and a surfactant. Dusts may thus be made from any finely divided solids, preferably those that are readily available and low in price, such as talc, attapulgite, natural clays, pyrophylite, diatomaceous earth, koalin, aluminum and magnesium

TABLE 3

| Urea Compound | Lb./acre | Plants Tested | | | |
|---|---|---|---|---|---|
| | | Millet | Corn | Mustard | Cotton |
| No. 7 and trichloracetic acid | ½ / 2 | 0 / 3 | 1 / 6 | 10 / 10 | 2 / 9 |
| No. 17 and trichloracetic acid | ½ / 2 | 0 / 3 | 1 / 3 | 8 / 10 | 1 / 8 |
| No. 29 and trichloracetic acid | ½ / 2 | 0 / 3 | 1 / 7 | 6 / 10 | 0 / 0 | silicates, montmorillonite, and similar substances such as are used as carriers in the insecticide art.

Dusts are commonly produced from a dust former such as talc by blending the active ingredient with talc and further grinding the mixture of active compound and talc with more talc so as to obtain a fluid dust of particle size less than about 50 microns. Fullers earth is often substituted and the active ingredient is often applied by spraying an organic solvent solution of the active compound of concentration in the range of 10 to 50% evaporating the solvent and using the fullers earth mixture as a concentrate for further blending in the field. Similarly, the clays are often used for the same purpose and the concentrates are often used for producing suspensions in water which are readily sprayed over the area to be treated, in which case carboxymethylcellulose, methyl cellulose and other carbohydrate gums may be used to aid in maintaining the suspensions.

The preferred herbicidal compositions are those in which water is used as the major component and the compound of this invention is a minor component. Such aqueous dispersions are usually prepared in the field so as to have a content of 0.5 to 10% of the active compound by dispersing a concentrate made up from about 10 to about 90% active compound, about 0.5 to 10% dispersing agent, and 0 to 90% inert diluent. Dispersing agents which are useful in such concentrates are the well-known surface active agents of the anionic, cationic or non-ionic type and include alkali metal (sodium or potassium) oleates and similar soaps, amine salts of long chain fatty acids (oleates), sulfonated animal and vegetable oils (fish oils and castor oil), sulfonated petroleum oils, sulfonated acyclic hydrocarbons, sodium salts of lignin sulfonic acids, alkylnaphthalene sodium sulfonates, sodium lauryl sulfonate, disodium monolaurylphosphates, sorbitol laurate, pentaerythritol monostearate, glycerol monostearate, polyethylene oxides, ethylene oxide condensates of stearic acid, stearyl alcohol, stearyl amine, rosin amines, dehydroabietyl amine and the like, lauryl amine salts, dehydroabietyl amine salts, lauryl pyridinium bromide, stearyl trimethyl ammonium bromide, and cetyl dimethylbenzyl-ammonium chloride. The aqueous dispersions may thus be made from the compounds themselves, from the compounds dissolved in water-soluble or water-insoluble solvent or from wettable dusts.

The herbicidal compositions are applied as a spray or as a dust to the seeds, plants, or soil in which the undesired plants normally grow. The threatment may be carried out by treatment before seeds sprout, after plant life has started or to the locus or area where plant growth in anticipated in advance of their emergence.

The active ingredients of the compositions are applied in an amount sufficient to exert the desired herbicidal action. This amount will vary with the time of treatment, stage of growth of both desirable plants which will simultaneously receive treatment and undesired plants or weeds. Where it is desired to selectively control the growth of plants in an area of mixed vegetation, the amount will be carefully determined so as to obtain the desired result which must be determined by experiment on the particular combination of plant life present. Where complete sterilization of the soil is desired, sufficient material is used to kill the most resistant plants. For selective control the rate of application will be from about 1 to 30 pounds per acre of the active compound of this invention. For complete sterilization where highly resistant plants are absent applications as low as 20 pounds per acre may be used and the rate may be extended to 50 pounds per acre in the case of highly resistant plants.

From the above data it will be appreciated that many variations in amounts of active compound to be used and modes of application are possible and will be obvious to those skilled in the art. The detailed description is thus given only to indicate the scope of the invention and no unnecessary limitation should be interpreted therefrom.

What we claim and desire to protect by Letters Patent is:

1. A herbicidally active composition of matter of the formula selected from the group consisting of:

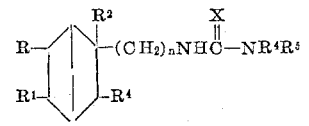

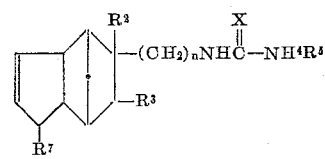

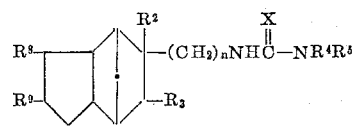

in which the R and $R^1$ substituents on the norbornyl ring represent radicals selected from the combinations consisting of

| R and $R^1$ | |
|---|---|
| —H | —H |
| —Cl | —H |
| —$CH_3$ | —H |
| —$CH_3$ | —$CH_3$ |
| —$C_2H_5$ | —$CH_3$ |
| —$OC_4H_9(n)$ | —H |
| —$C_6H_5$ | —H |
| —$C_2H_5$ | —H |
| —Cl | —Cl |
| —$C_3H_{7-n}$ | —H |
| —Cl | —$CH_3$ |
| —$OCH_3$ | —H |
| —$OC_2H_5$ | —H |
| —$CH_2Cl$ | —H |
| —H | —CN |

$R^7$ is selected from the group consisting of hydrogen and methyl, $R^8$ and $R^9$ are selected from the group consisting of hydrogen and chlorine, $n$ is selected from the group consisting of zero and one, X is selected from the group consisting of oxygen and sulfur, and $R^2$, $R^3$, and $R^4$ are selected from the group consisting of hydrogen and alkyl radicals, and $R^5$ is selected from the group consisting of $OR^6$ and $R^6$ and $R^6$ is an alkyl radical, said alkyl radicals having 1–4 carbon atoms, such that the total number of carbon atoms in $R^2$ and $R^3$ does not exceed 4 and the total number of carbon atoms in $R^4$ and $R^5$ is in the range of 1 to 8.

2.

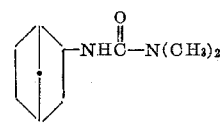

3.

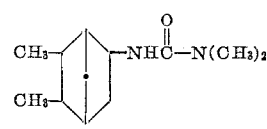

4.

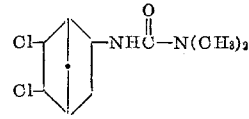

5.
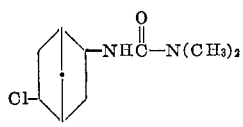

6.
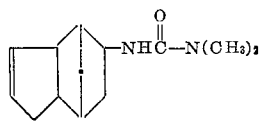

7.
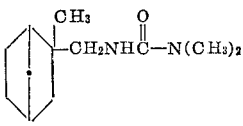

8.
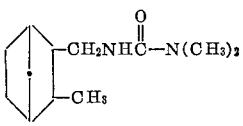

9.
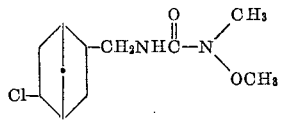

10.
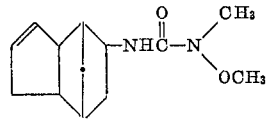

11.
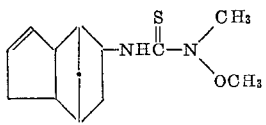

12. A composition suitable for destroying undesired plants when in a dispersed state comprising a dispersing material and, in amounts sufficient to exert herbicidal action, a compound of claim 1.

13. A composition of claim 12 containing a surface active dispersing agent in amount sufficient to impart water dispersibility to the composition.

14. A method of killing plants which comprises contacting said plants with a toxic amount of a dispersion of a compound of claim 1.

15. A composition suitable for destroying undesired plants which comprises a herbicide carrier as a major component and a compound of claim 1 as a minor component.

16.
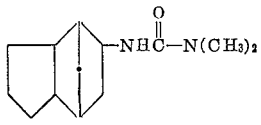

References Cited by the Examiner

UNITED STATES PATENTS

| | | | |
|---|---|---|---|
| 2,704,245 | 3/1955 | Searle | 71—2.6 |
| 2,705,195 | 3/1955 | Cupery et al. | 71—2.6 |
| 2,928,873 | 3/1960 | Shapiro et al. | 260—553 |
| 2,942,026 | 6/1960 | Boehme et al. | 260—553 |
| 3,006,954 | 10/1961 | Ramey et al. | 260—553 |

FOREIGN PATENTS

| | | |
|---|---|---|
| 220,063 | 6/1958 | Australia. |

ALEX MAZEL, *Primary Examiner.*

IRVING MARCUS, DUVAL T. McCUTCHEN, WALTER A. MODANCE, HENRY R. JILES,
*Assistant Examiners.*

UNITED STATES PATENT OFFICE
CERTIFICATE OF CORRECTION

Patent No. 3,304,167                    February 14, 1967

George A. Buntin et al.

It is hereby certified that error appears in the above numbered patent requiring correction and that the said Letters Patent should read as corrected below.

Column 4, line 27, for "1-methyl-1-n-propyl-3-" read -- 1-methyl-1-i-propyl-3 --; columns 11 and 12, in the table, fifth column, opposite No. 81, for "O" read -- S --; column 16, lines 5 to 10, the first formula should appear as shown below instead of as in the patent:

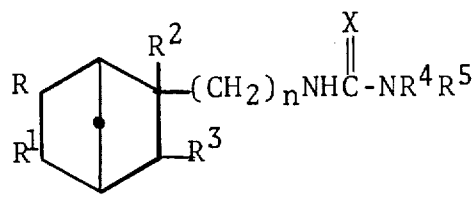

same column 16, lines 12 to 16, the second formula should appear as shown below instead of as in the patent:

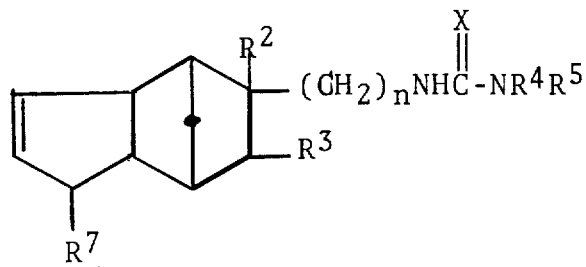

Signed and sealed this 17th day of October 1967.

(SEAL)
Attest:

EDWARD M. FLETCHER, JR.                    EDWARD J. BRENNER
Attesting Officer                            Commissioner of Patents